US008102466B2

(12) United States Patent
Matsushima

(10) Patent No.: US 8,102,466 B2
(45) Date of Patent: Jan. 24, 2012

(54) IMAGING DEVICE AND CONTROL METHOD THEREFOR, AND PROGRAM FOR THE SAME

(75) Inventor: Shuichiro Matsushima, Tokyo (JP)

(73) Assignee: Canon Kabushiki Kaisha (JP)

(*) Notice: Subject to any disclaimer, the term of this patent is extended or adjusted under 35 U.S.C. 154(b) by 675 days.

(21) Appl. No.: 11/862,581

(22) Filed: Sep. 27, 2007

(65) Prior Publication Data

US 2008/0074501 A1 Mar. 27, 2008

(30) Foreign Application Priority Data

Sep. 27, 2006 (JP) ................................ 2006-262721

(51) Int. Cl.
*H04N 5/225* (2006.01)
*H04N 5/76* (2006.01)
(52) U.S. Cl. .................................. 348/372; 348/231.99
(58) Field of Classification Search .................. None
See application file for complete search history.

(56) References Cited

U.S. PATENT DOCUMENTS

| 6,774,604 B2 * | 8/2004 | Matsuda et al. ............. 320/110 |
| 2003/0025809 A1 * | 2/2003 | Ohmura et al. .......... 348/231.99 |
| 2005/0057683 A1 * | 3/2005 | Terane ......................... 348/372 |
| 2005/0206749 A1 * | 9/2005 | Miyazaki ................. 348/231.99 |
| 2006/0184705 A1 * | 8/2006 | Nakajima ..................... 710/303 |

FOREIGN PATENT DOCUMENTS

| JP | 2002-237971 A | 8/2002 |
| JP | 2004-246174 A | 9/2004 |
| JP | 2006-229583 A | 8/2006 |

* cited by examiner

*Primary Examiner* — Sinh Tran
*Assistant Examiner* — Jason Flohre
(74) *Attorney, Agent, or Firm* — Rossi, Kimms & McDowell LLP

(57) ABSTRACT

An imaging device capable of preventing the imaging device from becoming unusable due to the battery running out or a lack of storage capacity in the storage medium, by performing battery charge and data transfer in a limited period of time. The imaging device includes a battery charge function for charging a battery and a data transfer function for transferring data recorded in a storage medium to an external apparatus. An amount of charge remaining in the battery is detected. A remaining storage capacity available for recording data in -the storage medium is detected. An order of priority for performing battery charge and data transfer is set. The function of the imaging device is switched between the battery charge and the data transfer based on the order of priority set by the setting unit, and the battery charge is executed in accordance with a detection result of the remaining charge detecting unit and the data transfer in accordance with a detection result of the remaining storage capacity detecting unit is executed.

5 Claims, 10 Drawing Sheets

IMAGING DEVICE AND CONTROL METHOD THEREFOR, AND PROGRAM FOR THE SAME

BACKGROUND OF THE INVENTION

1. Field of the Invention

The present invention relates to an imaging device for use in a digital camera having a battery charging function and a data transfer function, and to a control method therefor, and program for the imaging device.

2. Description of the Related Art

In recent years, the number of products which make use of the DLNA (Digital Living Network Alliance) standard for connecting electronic products and everyday electronic appliances to one another over a network has been increasing. Moreover, it is predicted that electronic apparatus in the home will become increasingly networked. Connection via a network allows the electronic apparatus to transfer data. For example, moving picture data captured by a digital video camera can be easily transferred to a hard disk recorder by simply connecting the digital video camera to the network.

Also, the storage capacity of storage media used in electronic apparatus is increasing extremely quickly. As a result, it is now possible to record high quality images and moving pictures onto storage media for long periods. When a storage medium is capable of repeatedly recording moving picture data or image data in this way, the captured image data must be periodically transferred to an external device. However, when the amount of data is large, the data transfer takes time.

Also, if the electronic apparatus is a portable digital camera, charge is also necessary since most cameras are battery driven. Generally, when the battery is being charged, portable cameras are constrained by the inability to perform other operations because built-in power supply circuits stop supplying power to power consuming units other than the charging circuit.

To solve the above-described problem, a technique by which current supplied from a data transfer bus is used to simultaneously charge the battery and transfer data has been proposed (see, for instance, Japanese Laid-Open Patent Publication (Kokai) No. 2002-237971).

However, in conventional cameras, battery charge and data transfer after use take a long time to complete. Hence the problem exists that the camera cannot be used for long periods while the battery charge and data transfer are taking place.

Also, when there is only a limited amount of time before the camera is to be reused, it may be the case that only one of the battery charge and the data transfer is possible. This means that the camera may have insufficient storage space or run out of battery when next used.

Moreover, it is the user who has to switch a camera operation unit between the batter charge and the data transfer. Hence, the user is obliged to monitor the amount of charge remaining in the battery and the available storage capacity in the storage medium. This is complicated and time consuming.

Hence, a way of automatically charging the battery and performing data transfer as appropriate in the limited period of time before the camera is next used is needed for when the battery charge and data transfer cannot be fully completed.

According to the above-described Japanese Laid-Open Patent Publication (Kokai) No. 2002-237971, the battery charge and data transfer can be performed simultaneously, and it is therefore possible to shorten the total period required for battery charge and data transfer. However, since the method of the Japanese Laid-Open Patent Publication (Kokai) No. 2002-237971 cannot be realized without a connection unit that includes a power supply function such as the USB (Universal Serial Bus) of a personal computer, connection using the method for connecting the electronic apparatus to the network is not necessarily possible. Also, since the construction of the power circuit is complex, an increase in the number of parts and a rise in cost are unavoidable.

SUMMARY OF THE INVENTION

The present invention provides an imaging device, and a control method therefor, and a program capable of preventing the imaging device from becoming unusable due to the battery running out or a lack of storage capacity in the storage medium, by performing battery charge and data transfer in a limited period of time.

To attain the above object, in a first aspect of the present invention, there is provided an imaging device including a battery charge function for charging a battery and a data transfer function for transferring data recorded in a storage medium to an external apparatus, comprising: a remaining charge detecting unit configured to detect an amount of charge remaining in the battery; a remaining storage capacity detecting unit configured to detect a remaining storage capacity available for recording data in the storage medium; a setting unit configured to set an order of priority for performing battery charge and data transfer; and a control unit configured to switch a function of the imaging device between the battery charge and the data transfer based on the order of priority set by the setting unit, execute the battery charge in accordance with a detection result of the remaining charge detecting unit and execute the data transfer in accordance with a detection result of the remaining storage capacity detecting unit.

The amount of charge remaining detected by the remaining charge detecting unit can be less than a prescribed value, the control unit can-prioritize battery charge without reference to the order of priority set by the setting unit, and can perform battery charge until the amount of charge remaining reaches at least the prescribed value.

The remaining storage capacity detected by the remaining storage capacity detecting unit can be less than a prescribed value, the control unit prioritizes data transfer without reference to the order of priority set by the setting unit, and performs data transfer until the remaining storage capacity reaches at least the prescribed value.

When a connection with the external apparatus is not established or the external apparatus is unable to receive transfer data, the control unit can perform battery charge without reference to the order of priority set by the setting unit.

When charge of the battery is not possible or the battery is not fitted to the imaging device, the control unit can perform data transfer charge without reference to the order of priority set by the setting unit.

To attain the above object, in a second aspect of the present invention, there is provided an imaging device having a battery charge function for charging a battery and a data transfer function for transferring data recorded on a storage medium to an external apparatus, comprising: a remaining charge detecting unit configured to detect an amount of charge remaining in the battery; and a control unit configured to, when the amount of charge remaining detected by the remaining charge detecting unit has not reached a first prescribed value, execute battery charge until the amount of charge remaining in the battery reaches a second prescribed value, subsequently execute data transfer, and then perform battery charge until the amount of charge remaining in the battery reaches a third prescribed value.

According to the present invention, switching between battery charge and data transfer is executed based on the order of priority to allow battery charge and data transfer in a limited period of time without extra work for the user, an increase in the number of parts, or a rise in cost. It is therefore possible to solve the problems of the imaging device becoming unusable due to the battery running out and insufficient remaining storage capacity on the storage medium.

To attain the above object, in a third aspect of the present invention, there is provided a control method for an imaging device having a battery charge function for charging a battery and a data transfer function for transferring data recorded on a storage medium to an external apparatus, comprising: a remaining charge detecting step of detecting an amount of charge remaining in the battery; a remaining storage capacity detecting step of detecting a remaining storage capacity available for recording data in the storage medium; a setting step of setting an order of priority for performing the battery charge and the data transfer; and a control step of switching between the battery charge and the data transfer based on the order of priority set in the setting step, executing the battery charge in accordance with a detection result of the remaining charge detecting step, and executing the data transfer in accordance with a detection result of the remaining storage capacity detecting step.

To attain the above object, in a fourth aspect of the present invention, there is provided a control method for an imaging device having a battery charge function for charging a battery and a data transfer function for transferring data stored in a storage medium to an external apparatus, comprising: a remaining charge detecting step of detecting an amount of charge remaining in the battery; and a control step of, when the amount of charge remaining detected in the remaining charge detecting step has not reached a first prescribed value, executing battery charge until the amount of charge remaining in the battery reaches a second prescribed value, subsequently executing data transfer, and then performing battery charge until the amount of charge remaining in the battery reaches a third prescribed value.

In order to solve the above-described problems, according to a fifth aspect of the present invention, there is provided a program for causing a computer to execute the control method for the imaging device.

According to the present invention, switching between battery charge and data transfer is executed based on the order of priority to allow battery charge and data transfer in a limited period of time without extra work for the user, an increase in the number of parts, or a rise in cost. It is therefore possible solve the problems of the imaging device becoming unusable due to the battery running out or the remaining storage capacity on the storage medium being insufficient.

The above and other objects, features, and advantages of the invention will become more apparent from the following detailed description taken in conjunction with the accompanying drawings.

BRIEF DESCRIPTION OF THE DRAWINGS

FIG. 2A and FIG. 2B are directed to menu selection screens; FIG. 2C is directed to a charging/transfer setting screen; and FIG. 2D is directed to a prescribed remaining charge/prescribed remaining storage capacity screen.

FIG. 4A is directed to a currently charging screen; FIG. 4B is directed to a currently transferring screen.

FIG. 7A and FIG. 7B are directed to examples of error display indicating that battery charge is not possible; FIG. 7C to FIG. 7E are directed to examples of error display indicating that data transfer is not possible.

DETAILED DESCRIPTION OF THE PREFERRED EMBODIMENTS

The present invention will now be described in detail with reference to the drawings showing preferred embodiments thereof.

It should be noted that the relative arrangement of the components, the numerical expressions and numerical values set forth in these embodiments do not limit the scope of the present invention unless it is specifically stated otherwise.

Figure 1:
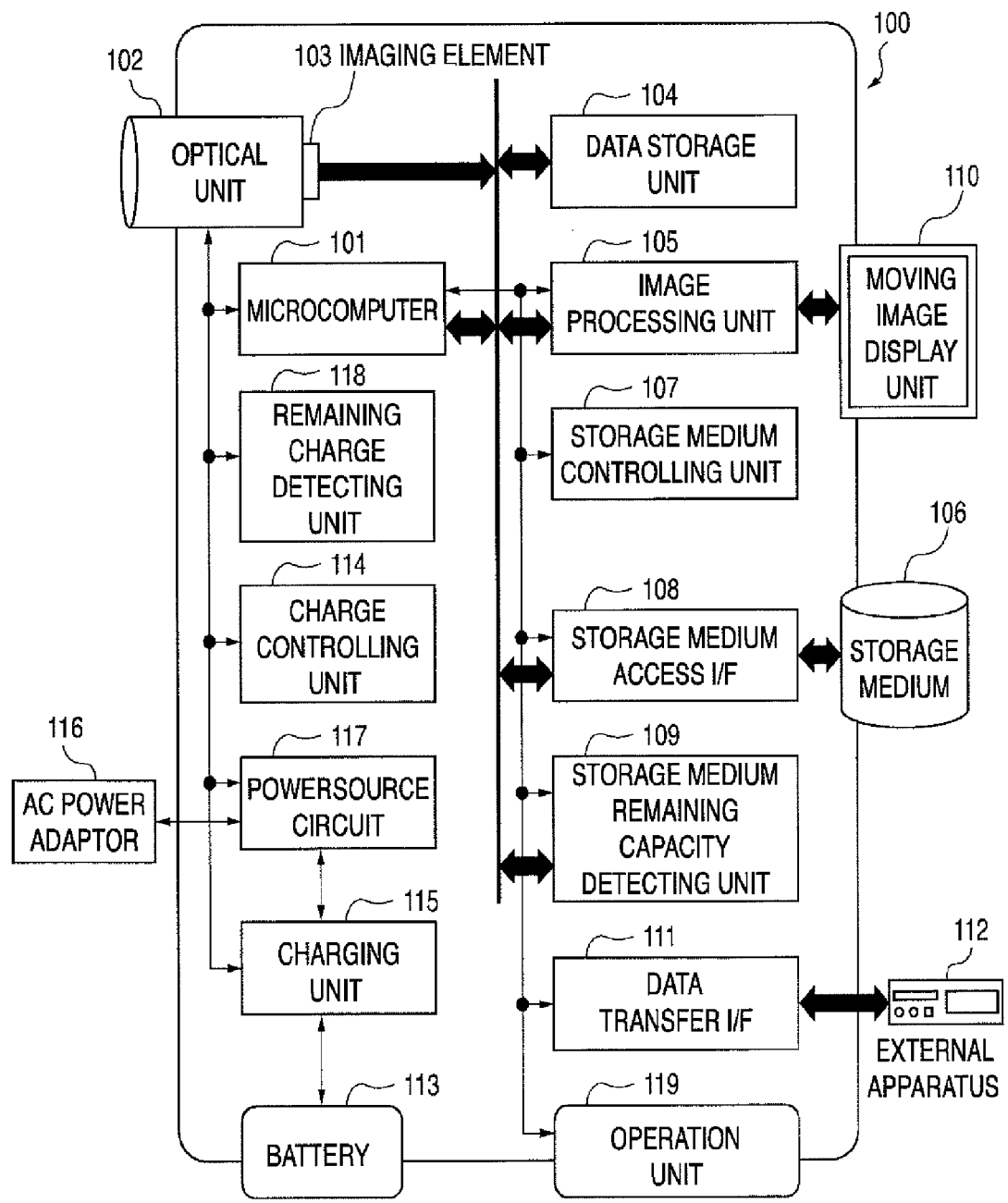
FIG. 1 is a block diagram showing a construction of a digital video camera as an imaging device of a first embodiment of the present invention.

FIG. 1 is a block diagram showing a construction of a digital video camera as an imaging device of a first embodiment of the present invention.

In FIG. 1, a digital video camera 100 includes a microcomputer 101, an optical unit 102, an imaging element 103, a storage medium 106, a storage medium remaining capacity detecting unit 109, a data transfer I/F 111, a battery 113, and a remaining charge detecting unit 118. The digital video camera 100 has a charge prioritizing mode in which charging the battery 113 is prioritized and a data transfer prioritizing mode in which transfer of image data to an external apparatus 112 is prioritized.

The microcomputer 101 is capable of controlling the digital video camera 100, and executes processing shown in the below-described flowcharts based on a program. The optical unit 102 includes a lens, an aperture, and a motor for driving the lens and aperture, receives external light (subject light), and forms an image on an imaging surface of the imaging element 103. The imaging element 103 converts the external light to an electronic signal. The signal resulting from the conversion by the imaging element 103 is supplied to an image processing unit 105 via a data storage unit 104, and becomes digital image data. The digital image data is temporarily stored in the data storage unit 104.

A storage medium controlling unit 107 controls reading and writing of the image data to and from the storage medium 106. The reading and writing of the image data to and from the storage medium 106 is performed via a storage medium access I/F 108. The storage medium remaining capacity detecting unit 109 detects a remaining storage capacity available for recording image data (hereinafter remaining storage capacity) in the storage medium 106. The image data stored in the storage medium 106 is stored in the data storage unit 104 via the storage medium access I/F 108.

The image data stored in the data storage unit 104 is converted by the image processing unit 105 into image data capable of being displayed by a moving image display unit 110. The moving image display unit 110 displays the image data (moving image data) based on control by the microcomputer 101. Also, the image data stored in the storage medium 106 can be transferred to the external apparatus 112 via the data transfer I/F 111.

A charge controlling unit 114 charges the battery 113 using a charging circuit 115. An AC power adaptor 116 connects the digital video camera 100 to an AC power source (not shown in the drawings). Current from the AC power source is supplied to a power source circuit 117 via the AC power adaptor 116. The power source circuit 117 supplies electrical power to the various units of the digital video camera 100. The remaining charge detecting unit 118 detects an amount of charge remaining in the battery 113. An operation unit 119 is used to select instructions for imaging, recording, playback and the like, and to select the charge prioritizing mode/transfer prioritizing mode, and, besides various operation buttons, includes a display unit for displaying various settings screens (FIG. 2A to FIG. 2D, FIG. 4A to FIG. 4B, FIG. 7A to FIG. 7E).

Settings and a setting method for the charge prioritizing mode/data transfer prioritizing mode in the digital video camera 100 of the present embodiment with the above-described construction is described below with reference to FIG. 2A to FIG. 2D.

Figure 3:
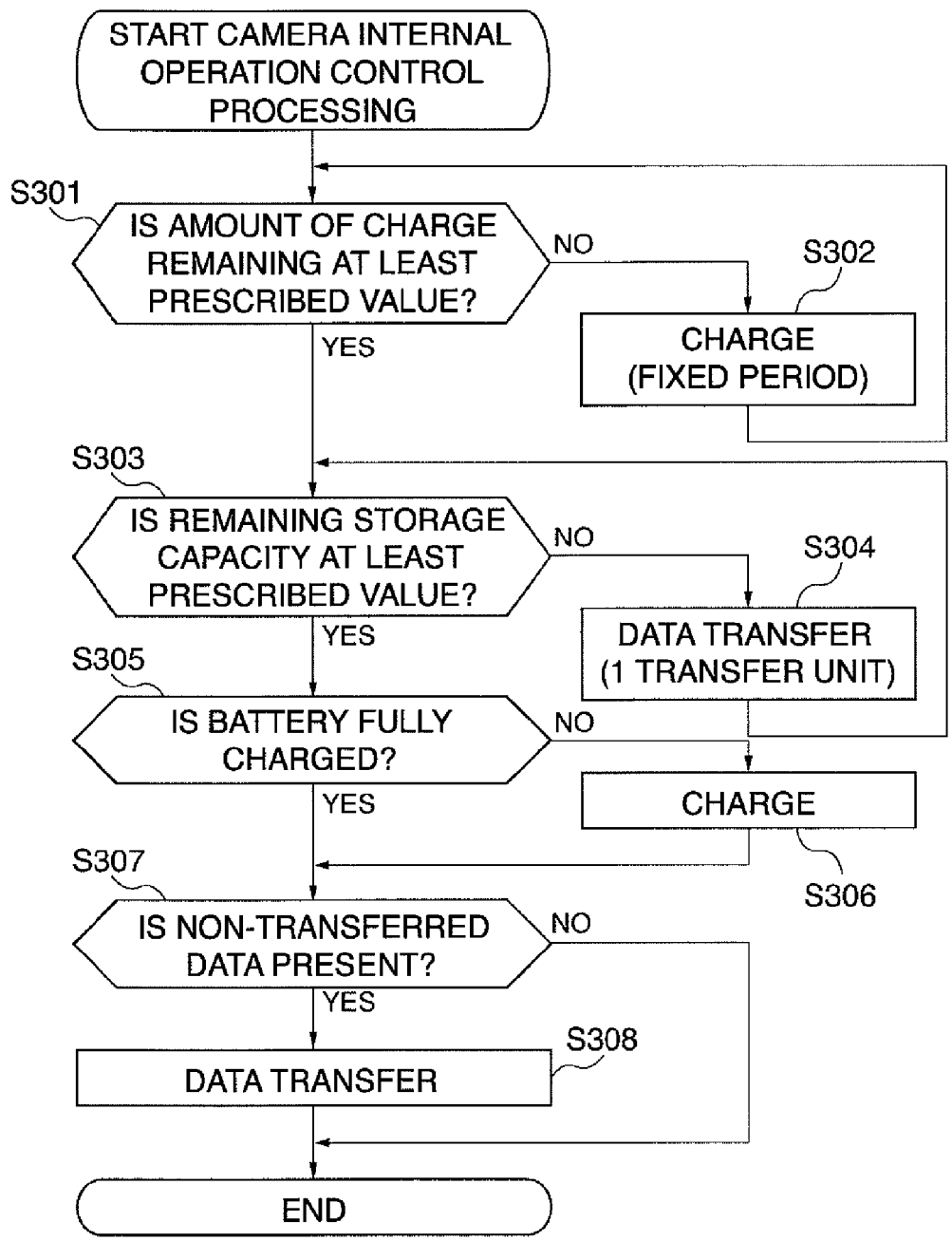
FIG. 3 is a flowchart showing a procedure for camera internal operation control processing when the digital video camera has been set to charge prioritizing mode.

The charge prioritizing mode is a mode for prioritizing the charge of the battery 113 over the data transfer (see FIG. 3). When the user selects the charge prioritizing mode using the operation unit 119, the microcomputer 101 begins charge prioritizing mode processing. At this point, the microcomputer 101 begins charging the battery 113 using the charging circuit 115, and continues charging until a user-indicated prescribed remaining charge (a prescribed value for the amount of charge remaining) is reached.

The microcomputer 101 then performs data transfer to the external apparatus 112 via the data transfer I/F 111 until a user-indicated prescribed remaining storage capacity (a prescribed value for the amount of remaining storage capacity), which is to say the available storage space in the storage medium 106, is reached. On completion of the data transfer, the amount of charge remaining in the battery 113 and the remaining storage capacity in the storage medium 106 have reached the corresponding prescribed values. In any left over time, the microcomputer 101 charges the battery 113 until fully charged and transfers all remaining data to the storage medium 106.

Figure 5:
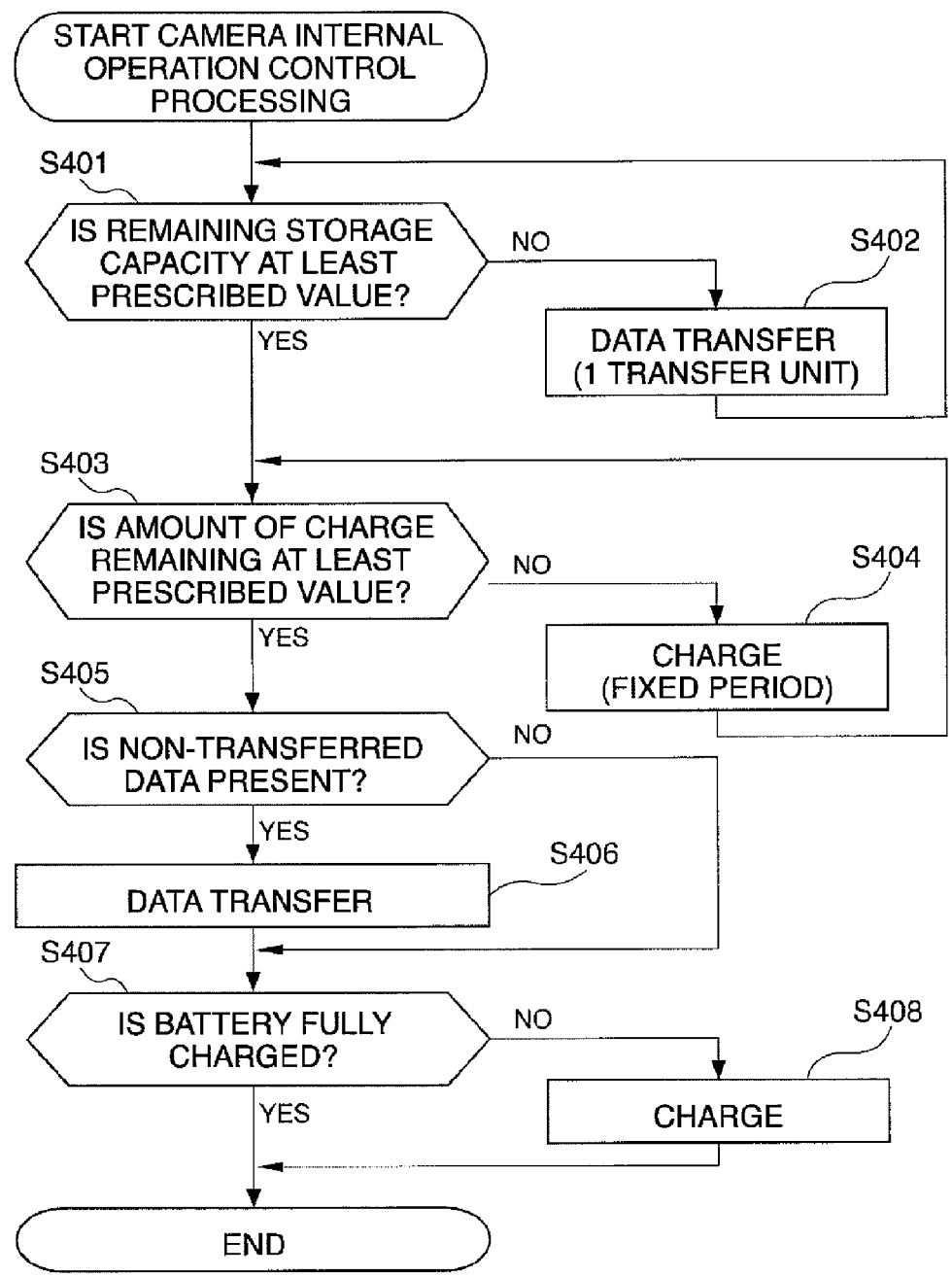
FIG. 5 is a flowchart showing the procedure for camera internal operation control processing when a digital video camera, as an imaging device of a second embodiment of the present invention, has been set to data transfer prioritizing mode.

The data transfer prioritizing mode, on the other hand, is a mode for prioritizing the data transfer to the external apparatus 112 over the charge of the battery 113 (see FIG. 5). Thus, in the data transfer prioritizing mode processing, the order of priority for the data transfer processing and the charge processing is the reverse of that in the above-described charge prioritizing mode.

Figure 2A:
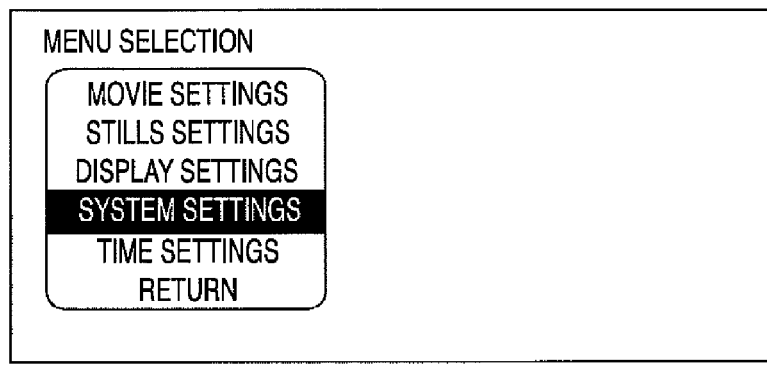
FIG. 2A to FIG. 2D show various setting screens of the digital video camera in FIG. 1.
Figure 2B:
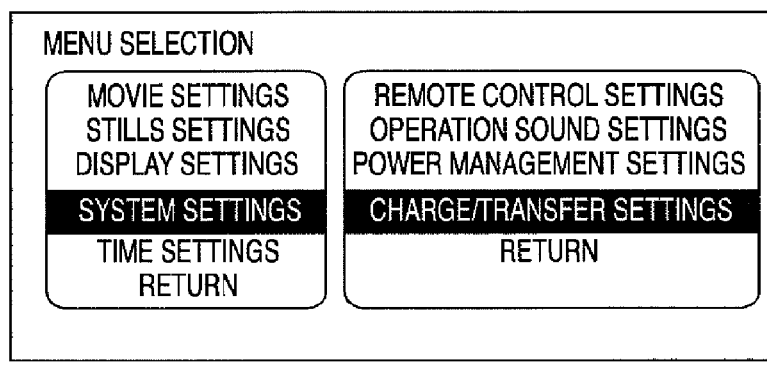
Figure 2C:
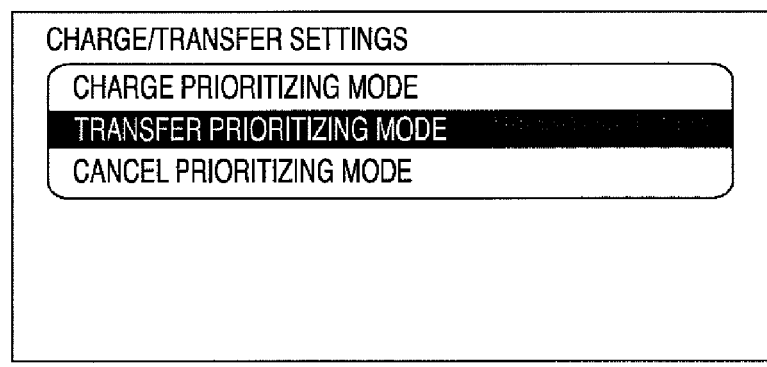
Figure 2D:
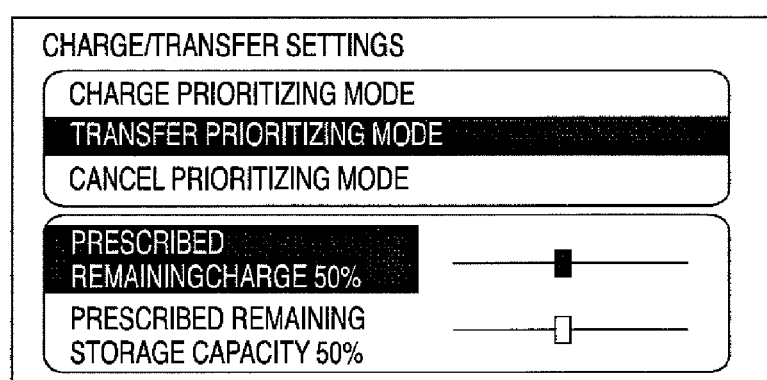

FIG. 2A to FIG. 2D show various setting screens of the digital video camera in FIG. 1; FIG. 2A and FIG. 2B are directed to menu selection screens; FIG. 2C is directed to a charging/transfer setting screen; and FIG. 2D is directed to a prescribed remaining charge /prescribed remaining storage capacity screen.

A setting method for the charge prioritizing mode/data transfer prioritizing mode is described in FIG. 2A to FIG. 2D. Initially, when the user performs a predetermined operation on the operation unit 119, the microcomputer 101 displays a menu selection screen 201 on the moving image display unit 110. Items on the menu selection screen 201 include "movie settings", "stills settings", "display settings", "system settings", "time settings" and "return". When the user selects "system settings" from the menu selection screen 201, the microcomputer 101 switches from the menu selection screen 201 to a "system settings" menu selection screen 202. Items on the "system settings" menu selection screen 202 include "remote control settings", "operation sound settings", "power management settings", "charge/transfer settings", and "return".

When the user selects "charge/transfer settings" from the "system settings" menu selection screen 202, the microcomputer 101 switches from the menu selection screen 202 to a charge/transfer setting screen 203. Items on the charge/transfer setting screen 203 include "charge prioritizing mode", "transfer prioritizing mode", and "cancel prioritizing mode". When the user selects "charge prioritizing mode" or "transfer prioritizing mode" from the charge/transfer setting screen 203, the microcomputer 101 switches to a prescribed remaining charge/prescribed remaining storage capacity setting screen 204. Items on the prescribed remaining charge/prescribed remaining storage capacity setting screen 204 include "prescribed remaining charge" and "prescribed remaining storage capacity".

When the user selects "charge prioritizing mode" or "transfer prioritizing mode" from the charge/transfer setting screen 203, it is possible to set the "prescribed remaining charge" or the "prescribed remaining storage capacity" separately via the prescribed remaining charge/prescribed remaining storage capacity setting screen 204. The setting of the prescribed remaining amount is substantially the same for both the charge prioritizing mode and the transfer prioritizing mode.

When desiring neither the "charge prioritizing mode" nor the "transfer prioritizing mode", the user can select the "cancel prioritizing mode" from the charge/transfer setting screen 203. In this case, the charge of the battery 113 is performed when the digital video camera 100 is connected to the AC power source via the AC power adaptor 116. Moreover, the data transfer to the external apparatus 112 is performed when the user causes data transfer to begin via an operation (a predetermined operation on the operation unit 119).

Thus, in the digital video camera 100, it is possible to set the order of priority for the order in which the battery charge and the data transfer is to be performed. Also, in the digital video camera 100, charge of battery 113 to reach the prescribed remaining charge and data transfer from the storage medium 106 to reach a prescribed remaining storage capacity can be performed within a fixed period.

In the present embodiment, the camera internal operation control processing when the digital video camera 100 has been set to the charge prioritizing mode is described with reference to the flow chart of FIG. 3.

FIG. 3 is a flowchart showing the procedure for camera internal operation control processing when the digital video camera 100 has been set to the charge prioritizing mode.

As shown in FIG. 3, at the beginning of processing in the charge prioritizing mode set by the user via the operation unit 119, the microcomputer 101 of the digital video camera 100 checks the amount of charge remaining in the battery 113 using the remaining charge detecting unit 118. Next, the microcomputer 101 calculates the amount of charge remaining in the battery 113 based on a detection result from the remaining charge detecting unit 118, and judges whether the amount of charge remaining is at least the prescribed value (step S301). Here, is it is assumed that the prescribed remaining charge for the battery 113 is 50% of the fully charged level.

When the amount of charge remaining in the battery 113 is less than 50% of the fully charged level, the microcomputer 101 charges the battery 113 using the charging circuit 115, and continues charging in a succession of fixed periods until the charge level reaches 50% of the fully charged-level (step S302). When a judgment result in step S301 indicates that the amount of charge remaining in the battery 113 exceeds 50% of the fully charged level or has reached at least 50% of the fully charged level as a result of charging, the microcomputer 101 judges that the amount of charge remaining is sufficient, and proceeds to step S303.

Next, to perform data transfer, the microcomputer 101 detects the remaining storage capacity of the storage medium 106 using the storage medium remaining capacity detecting unit 109. The microcomputer 101 calculates the remaining storage capacity in the storage medium 106 based on a detection result from the storage medium remaining capacity detecting unit 109, and judges whether the remaining storage capacity of the storage medium 106 is at least the prescribed value (step S303) Here, it is assumed that the prescribed value for the remaining storage capacity of the storage medium 106 has been set to 50% of the total capacity of the storage medium 106.

When the judgment result of step S303 indicates that the remaining storage capacity of the storage medium 106 is less than 50% of the total capacity, the microcomputer 101 begins transferring data to the external apparatus 112 connected to the digital video camera 100 via the data transfer I/F 111 (step S304). Data transfer is performed file by file, with one file being the smallest data unit. When, the remaining storage capacity of the storage medium 106 exceeds 50% of the total capacity, or has exceeded 50% of the total capacity as a result of the data transfer, the microcomputer 101 proceeds to step S305.

For an affirmative judgment in the above-described step S303, the remaining charge in the battery 113 has to exceed 50% of the fully charged level, and the remaining storage capacity of the storage medium 106 has to exceed 50% of the total capacity. The microcomputer 101 judges whether the amount of charge remaining in the battery 113 is the fully charged level (step S305). When the amount of charge remaining is less than the fully charged level, the microcomputer 101 charges the battery 113 using the charging circuit 115 (step S306), and then proceeds directly to step S307 when the amount of charge remaining reaches the fully charged level.

Next, the microcomputer 101 judges whether non-transferred data is present in the storage unit 106 (step S307). When non-transferred data is absent, the microcomputer 101 ends the processing. When non-transferred data is present, the microcomputer 101 transfers all remaining data in the storage medium 106 to the external apparatus 112 via the data transfer I/F 111, and ends the processing. When the processing ends, the battery 113 is fully charged and the storage medium 106 is empty.

Figure 4B:
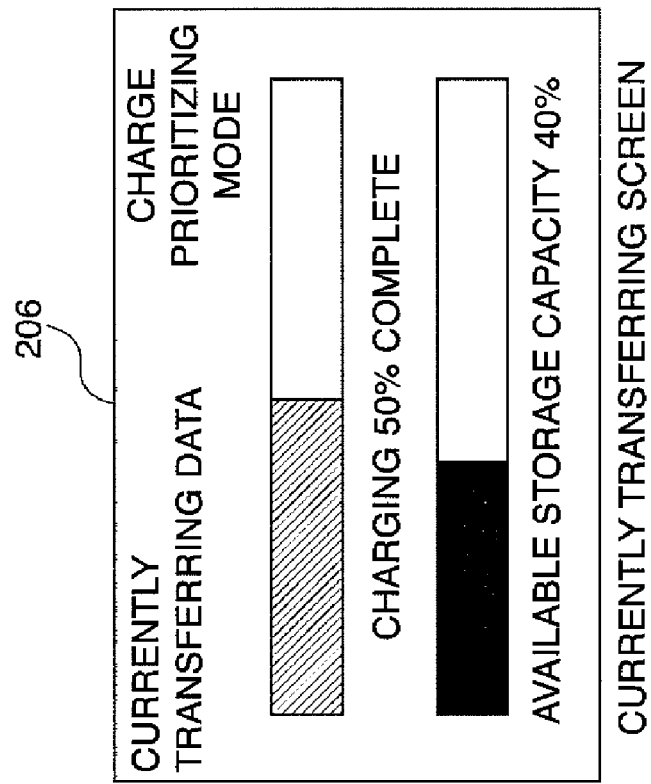
FIG. 4A and FIG. 4B show setting screens of the digital video camera.
Figure 4A:
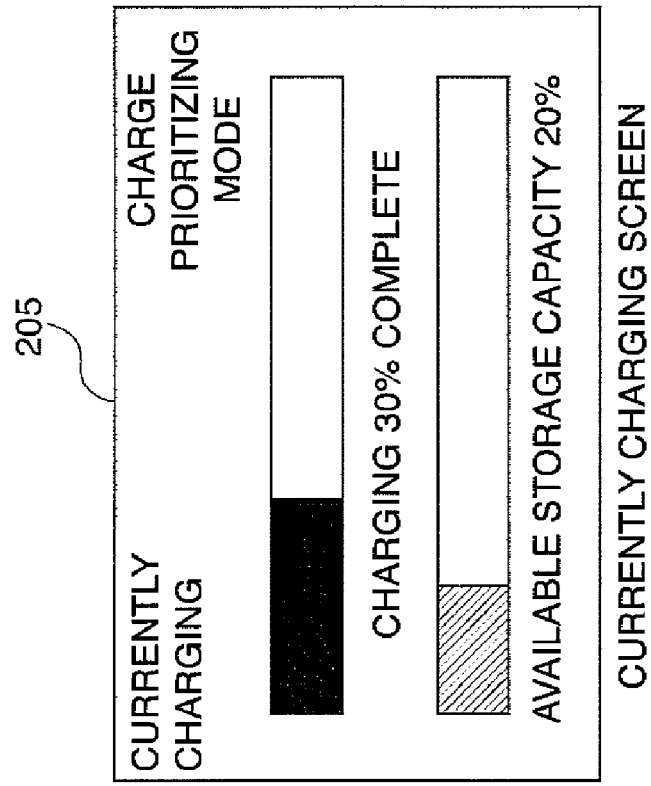

The following describes an example of displaying a currently charging screen and a currently transferring screen when the digital video camera 100 has been set to the charge prioritizing mode, with reference to FIG. 4A and FIG. 4B.

FIG. 4A and FIG. 4B show setting screens of the digital video camera 100; FIG. 4A is directed to a currently charging screen; and FIG. 43 is directed to a currently transferring screen.

When the battery 113 is being charged, a currently charging screen 205, as shown in FIG. 4A and FIG. 4B, is displayed on the display unit. On the currently charging screen 205, "currently charging" is displayed in an upper left-hand portion, and the selected "charge prioritizing mode" is displayed in an upper right-hand portion. A process bar is used to give a visual representation of the remaining charge level in the battery 113, and a value is displayed below the process bar. Note that an available storage capacity of the storage medium 106 is also displayed on the currently charging screen 205 at this point, but with the process bar in a grey-out state. This allows the user to see which of the charge and the data transfer is being performed.

Conversely, when data is being transferred to the external apparatus 112 via the data transfer I/F 111, a currently transferring screen 206 is displayed on the display unit. On the currently transferring screen 206, "currently transferring data" is displayed in an upper left-hand portion, and the selected "charge prioritizing mode" is displayed in an upper right-hand portion. A process bar is used to give a visual representation of the remaining storage capacity in the storage medium 106, and a value is displayed below the process bar. Note that the amount of remaining charge in the battery 113 is also displayed on the currently transferring screen 206 at this point, but with the process bar in a grey-out state. This allows the user to see which of the charge and the data transfer is being performed.

As described above, in the digital video camera 100 according to the present embodiment, charge of the battery 113 to the prescribed value and data transfer to the external apparatus 112 to a prescribed value are performed in a fixed period in accordance with control from the microcomputer 101. As a result, it is possible to secure an amount charge in the battery 113 and a remaining storage capacity in the storage medium 106 that are sufficient to allow image capture, even when only a limited amount of time is available before next use. Moreover, the battery charge and data transfer in the limited amount of time is possible without extra work from the user, an increase in the number of parts the digital video camera 100, or a rise in cost. Hence, it is possible to solve the problem of the digital video camera 100 becoming unusable due to the battery running out or insufficient remaining storage capacity in the storage medium.

The second embodiment of the present invention differs from the first embodiment in terms of the digital video camera processing shown in FIG. 5. Since other elements of the present embodiment resemble corresponding elements in the above-described first embodiment (FIG. 1), a description of these other elements is omitted.

In the present embodiment, the camera internal operation when the digital video camera 100a has been set to the charge prioritizing mode is described with reference to the flow chart of FIG. 5.

FIG. 5 is a flowchart showing the procedure for the camera internal operation control processing when the digital video camera 100a has been set to the data transfer prioritizing mode.

As shown in FIG. 5, at the beginning of the processing in data transfer prioritizing mode set by the user using the operation unit 119, the microcomputer 101 of the digital video camera 100a detects the remaining storage capacity in the storage medium 106 using the storage medium remaining capacity detecting unit 109 in order to perform data transfer. Next, the microcomputer 101 calculates the remaining storage capacity in the storage medium 106 based on a detection result from the storage medium remaining capacity detecting unit 109, and judges whether the remaining storage capacity of the storage medium 106 is at least the prescribed value (step S401). Here, it is assumed that the prescribed value for the remaining storage capacity of the storage medium 106 is 50% of the total capacity of the storage medium 106.

When the remaining storage capacity of the storage medium 106 is less than 50% of the total capacity, the microcomputer 101 begins transferring data to the external apparatus 112 connected to the digital video camera 100a via the data transfer I/F 111 (step S402). Data transfer is performed file by file, with one file being the smallest data unit. When the remaining storage capacity of the storage medium 106 exceeds 50% of the total capacity, or has exceeded 50% of the total capacity as a result of data transfer, the microcomputer 101 proceeds to step S403.

Next, the microcomputer 101 checks the amount of charge remaining in the battery 113 using the remaining charge detecting unit 118. The microcomputer 101 calculates the amount of charge remaining in the battery 113 based on the detection result from the remaining charge detecting unit 118, and judges whether the amount of charge remaining is at least the prescribed value (step S403). Here is it is assumed that the prescribed value for the amount of charge remaining in the battery 113 is 50% of the fully charged level.

When the amount of charge remaining in the battery 113 is less than 50% of the fully charged level, the microcomputer 101 charges the battery 113 using the charging circuit 115 for a fixed period, and continues charging in a succession of fixed periods until the amount of charge remaining reaches at least 50% of the fully charged level (step S404). When the amount of charge remaining in the battery 113 exceeds 50% of the fully charged level, or has reached at least 50% of the fully charged level as a result of the charge of the battery 113, the microcomputer 101 judges that the charge remaining is sufficient, and proceeds to step S405.

For an affirmative judgment in the above-described step 403, the amount of charge remaining in the battery 113 must exceed 50% of the fully charged level, and the remaining storage capacity of the storage medium 106 must exceed 50% of the total capacity. The microcomputer 101 judges whether non-transferred data is present in the storage unit 106 (step S405). When non-transferred data is present, the microcomputer 101 transfers all remaining data in the storage medium 106 to the external apparatus 112 via the data transfer I/F 111 (step S406). When non-transferred data is absent, the microcomputer 101 proceeds directly to step S407.

Next, the microcomputer 101 judges whether an amount of charge remaining in the battery 113 is the fully charged level (step S407). When the amount of charge remaining is the fully charged level, the microcomputer 101 ends the processing. When the remaining charge is less than the fully charged level, the microcomputer 101 charges the battery 113 using the charging circuit 115 (step S408), and ends the processing. When the processing ends, the battery 113 is fully charged and the storage medium 106 is empty.

As described above, according to the present embodiment, battery charge and data transfer are possible in a limited period of time without extra work from the user or an increase in the number of parts of the digital camera 100a, or a rise in cost. Hence, it is possible to solve the problem of the digital video camera 100a becoming unusable due to the battery running out or insufficient remaining storage capacity in the storage medium.

The third embodiment of the present invention differs from the above described first embodiment in terms of the digital video camera processing shown in the flowchart of FIG. 6. Since the other elements of the present embodiment resemble corresponding elements in the above-described first embodiment (FIG. 1), a description of these elements is omitted.

In the present embodiment, camera internal operation, including error processing, when the digital video camera 100b has been set to the charge prioritizing mode is described with reference to the flow chart of FIG. 6A and FIG. 6B.

Figure 6A:
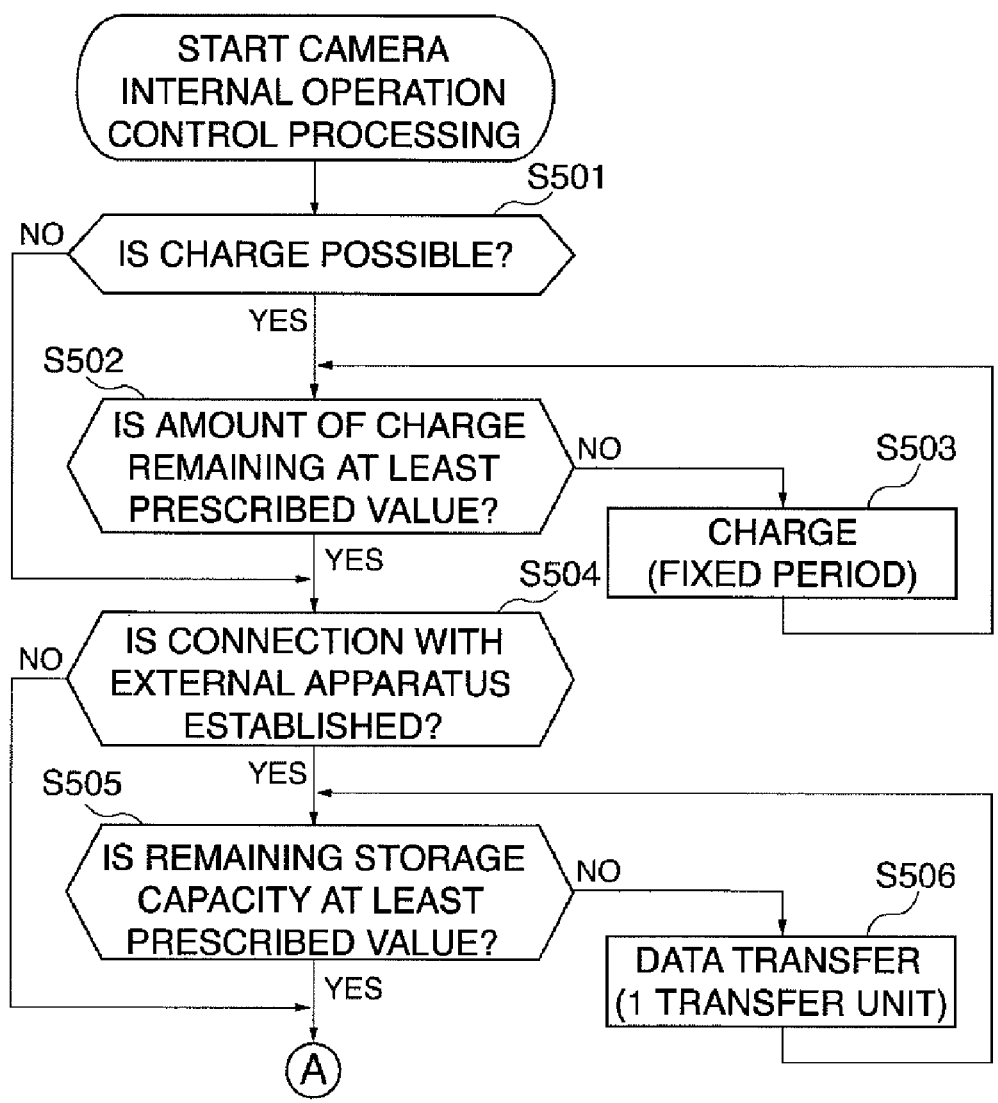
FIG. 6A and FIG. 6B are flowcharts showing the procedure for camera internal operation control processing when a digital video camera, as an imaging device of a third embodiment of the present invention, has been set to charge prioritizing mode.
Figure 6B:
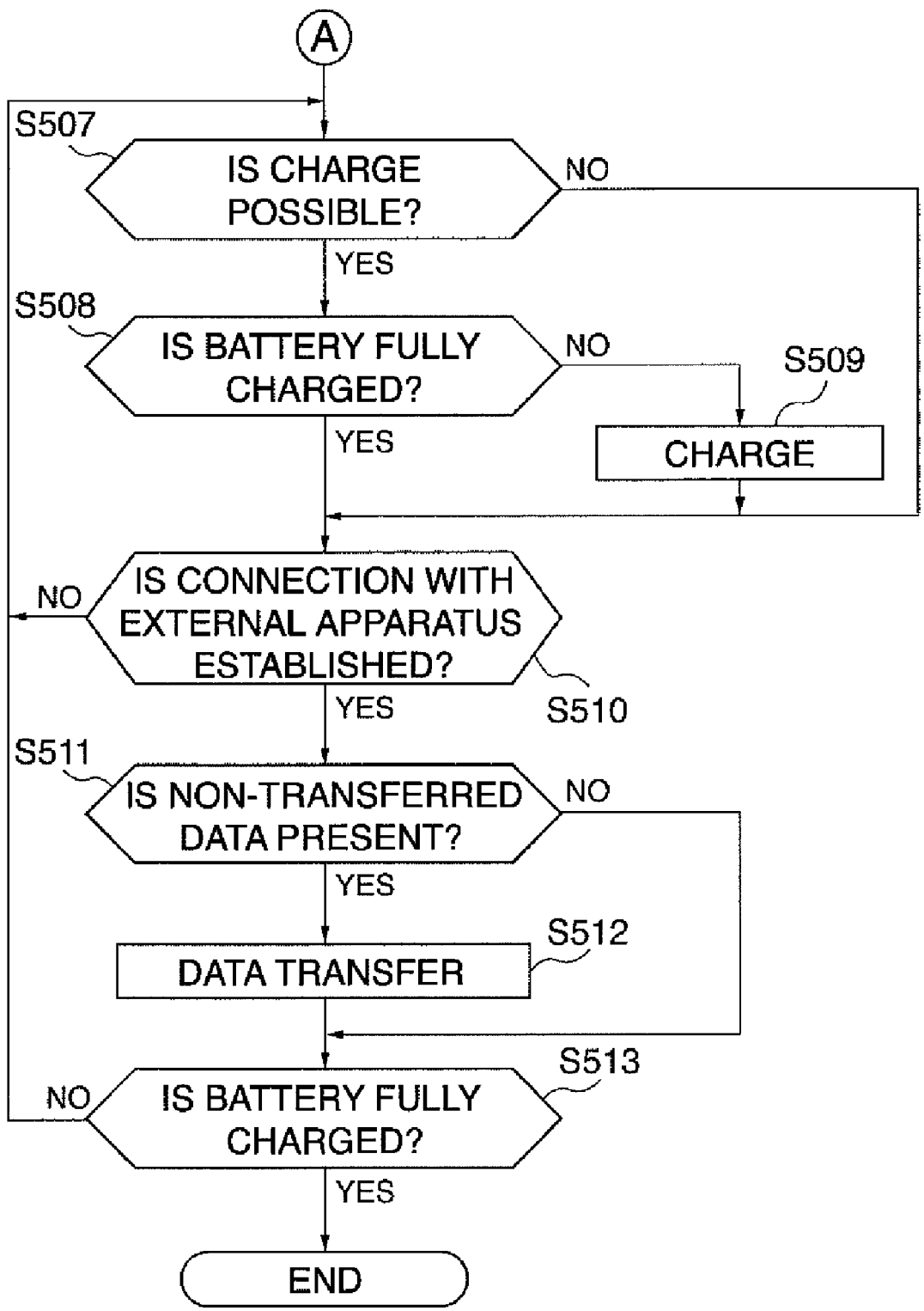

FIG. 6A and FIG. 6B are a flowchart showing a procedure for camera internal operation control processing when the digital video camera 100b has been set to the charge prioritizing mode.

As shown in FIG. 6A and FIG. 6B, at the beginning of processing in the charge prioritizing mode set by the user via the operation unit 119, the microcomputer 101 of the digital video camera 100b detects the amount of charge remaining in the battery 113 using the remaining charge detecting unit 118. Next, the microcomputer 101 calculates the amount of charge remaining in the battery 113 based on the detection result from the remaining charge detecting unit 118 (step S501). When the battery 113 cannot be charged, the microcomputer 101 proceeds to step S504.

When the check result of step S501 indicates that the battery 113 can be charged, the microcomputer 101 judges whether the amount of charge remaining in the battery 113 is at least the prescribed value based on the detection result from the remaining charge detecting unit 118 (step S502). When the amount of charge remaining in the battery 113 is less than the prescribed value (i.e. charge is possible), the microcomputer 101 charges the battery 113 for a succession of fixed periods using the charging circuit 115 (step S503). When the amount of charge remaining in the battery 113 is greater than the prescribed value (i.e. charge is not possible), the microcomputer 101 proceeds to step S504 without performing charge processing.

Next, the microcomputer 101 checks whether a connection for data transfer between the digital video camera 100b and the external apparatus 112 has been established. When the connection with the external apparatus 112 has been established (i.e. data transfer is possible), the microcomputer 101 transfers data to the external apparatus 112 to the external apparatus 112 via the data transfer I/F 111 (step S505 and step S506) using processing substantially the same as the processing of step S303 and step S304 in FIG. 3. When the check result of step S504 indicates that the connection with the external apparatus 112 has not been established (i.e. data transfer is not possible), the microcomputer 101 proceeds to step S507. Note that the case when the data transfer is not possible includes when the external apparatus 112 is unable to receive transferred data due to being in the midst of performing a predetermined operation (such as a recording operation on a hard disc recorder) or the like.

Charge processing is performed from step S507 to step S509. The microcomputer 101 initially checks whether charge of the battery 113 is possible based on the detection result from the remaining charge detecting unit 118 (step S507). When charge is not possible, the microcomputer proceeds to step S510. When charge is possible, the microcomputer 101 judges whether the battery 113 is fully charged (step S508). When the battery 113 is not fully charged, the microcomputer 101 performs charge until the battery 113 becomes fully charged, using the charging circuit 115 (step S509). When the judgment result of step S508 indicates that the battery 113 is fully charged, the microcomputer 101 proceeds to step S510.

Data transfer processing is performed from step S510 to step S512. The microcomputer 101 initially checks whether a connection between the digital video camera 100b and the external apparatus 112 has been established (step S510). When the connection with the external apparatus 112 has not been established, the microcomputer returns to the charge processing. If, at this point, the charge processing has already been completed and the battery 113 is fully charged (YES to step S508 and NO to step S510), the microcomputer 101 skips the charge processing and loops until the connection with external apparatus 112 can be established. When the check result of step S510 indicates that the connection with the external apparatus 112 has been established, the microcomputer 101 judges whether non-transferred data is present in the storage medium 106 (step S511). When non-transferred data is present, the microcomputer 101 transfers all remaining data in the storage medium 106 to the external apparatus 112 via the data transfer I/F 111 (step S512). When non-transferred data is absent, the microcomputer 101 proceeds directly to step S513.

Arrival at step S513 indicates that the data transfer has been completed, and so the microcomputer 101 then checks whether the battery 113 is fully charge based on the latest detection result from the remaining charge detecting unit 118 (step S513). When the battery 113 is not fully charged, the microcomputer 101 returns to the charge processing. When the battery 113 is fully charged, the microcomputer 101 ends the processing.

The following describes examples of errors displayed during processing in the charge prioritizing mode of the digital video camera 100b, with reference to FIG. 7A to FIG. 7E.

Figure 7A:
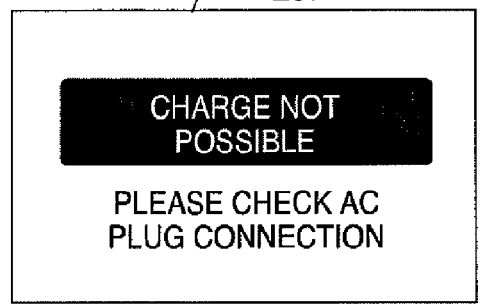
FIG. 7A to FIG. 7E show examples of error display by the digital video camera when performing the camera internal operation processing shown in FIG. 6A and FIG. 6B.
Figure 7B:
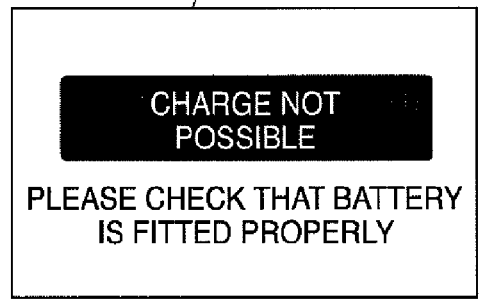
Figure 7C:
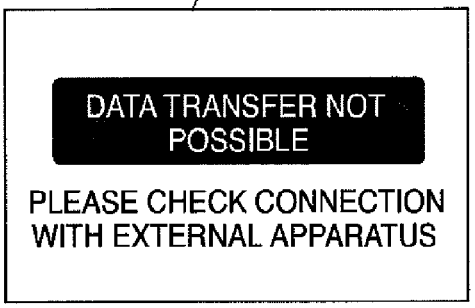
Figure 7D:
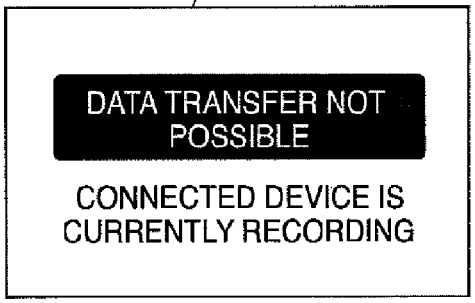
Figure 7E:
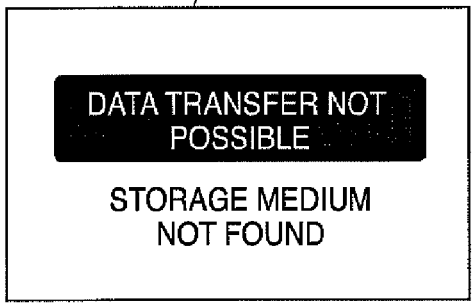

FIG. 7A to FIG. 7E show examples of errors displayed in the digital video camera 100b. FIG. 7A and 7B are examples of errors displayed to indicate that battery charge is not possible. FIG. 7B to FIG. 7E are examples of errors displayed to indicate that data transfer is not possible.

As shown in FIG. 7, one reason for being unable to charge the battery 113 is that the digital video camera 100b is not connected to the AC power source via the AC power adaptor 116. In this case a charge not possible warning screen 207 is displayed on the display unit. Alternatively, when the battery 113 is not fitted to the digital video camera 100b, a charge not possible warning screen 208 is displayed.

One reason for being unable to transfer data is that the data transfer I/F 111 of the digital video camera 100b is not connected to the external apparatus 112 via a network cable or the like. In this case, a data transfer not possible warning screen 209 is displayed. Alternatively, when the digital video camera 100b is connected to the external apparatus 112 but the connected external apparatus 112 has refused data transfer due to being in the midst of a recording or the like, a data transfer not possible warning screen 210 is displayed. When the storage medium 106 is not fitted to the digital video camera 100b, a data transfer not possible warning screen 211 is displayed.

As described above, according to the present embodiment, battery charge and data-transfer are possible in a limited period of time without extra work from the user, an increase in the number of parts of the digital camera 100b, or a rise in cost. Hence, it is possible to solve the problem of the digital video camera 100b becoming unusable due to the battery running out or insufficient remaining storage capacity in the storage medium.

Figure 8A:
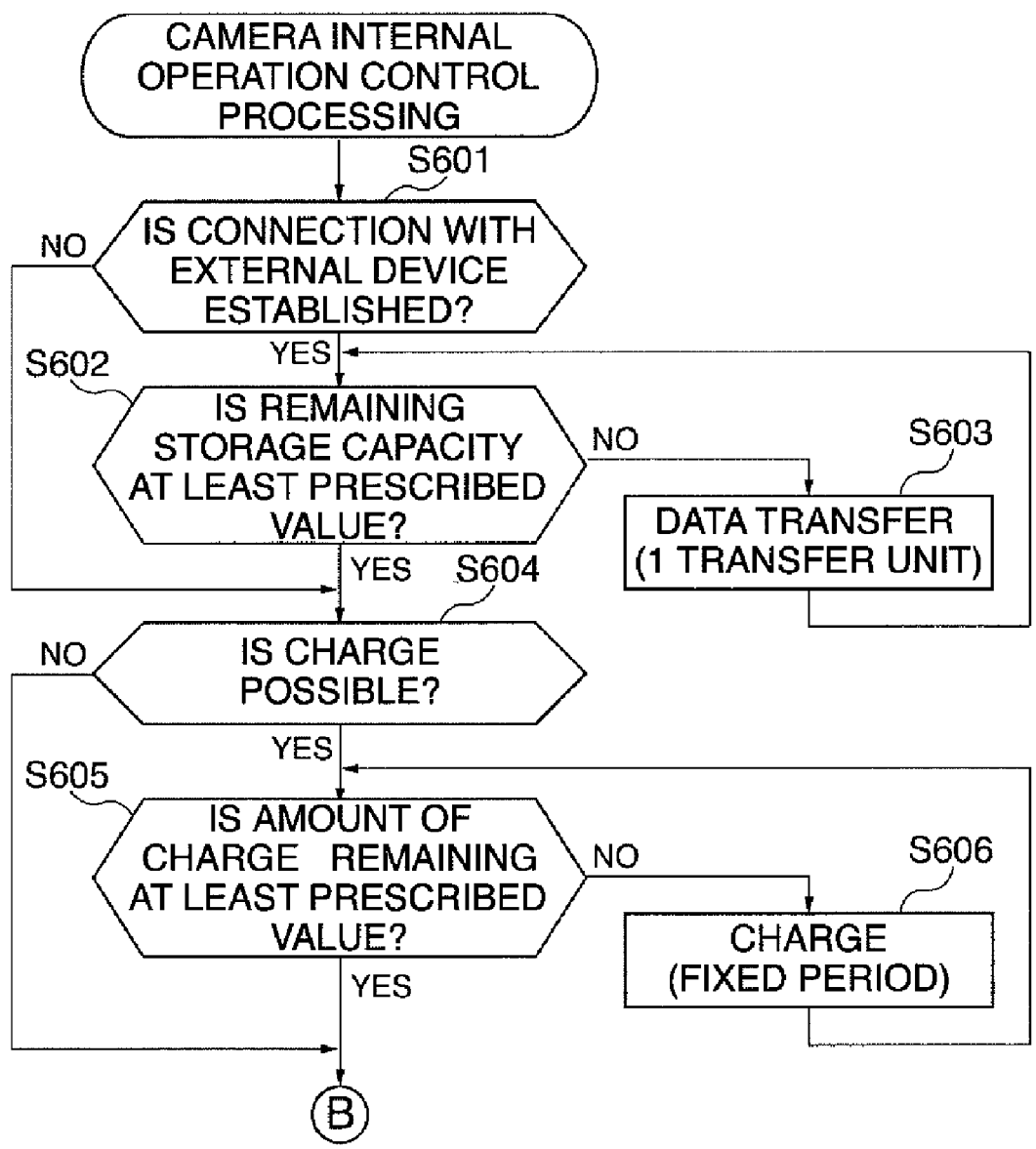
FIG. 8A and FIG. 8B are flowcharts showing the procedure for camera internal operation control processing when a digital video camera, as an imaging device of a fourth embodiment of the present invention, has been set to data transfer prioritizing mode.
Figure 8B:
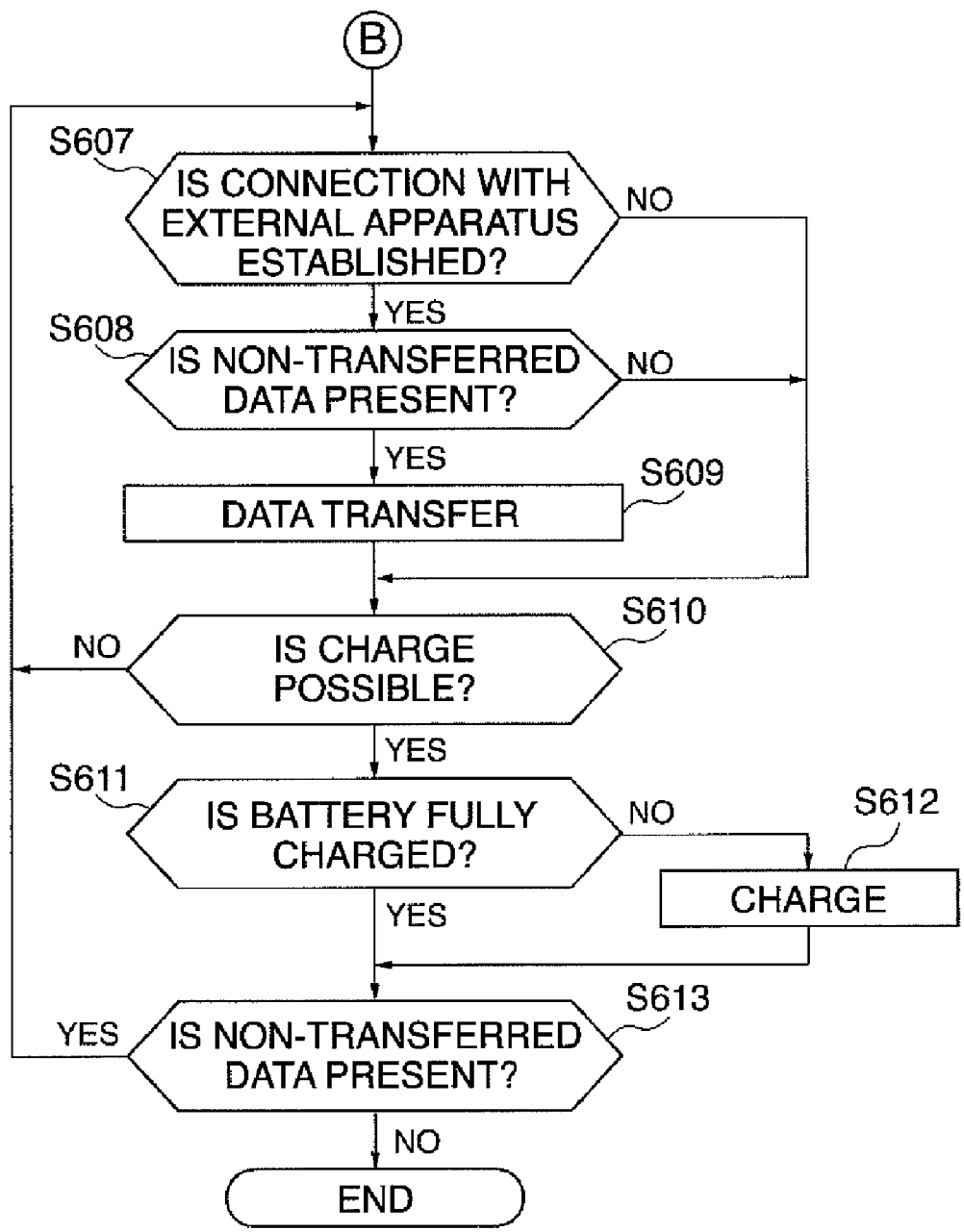

The fourth embodiment of the present invention differs from the first embodiment in terms of the digital video camera processing shown in the flowcharts of FIG. 8A and FIG. 8B. Since the other elements of the present embodiment resemble corresponding elements in the above-described first embodiment (FIG. 1), a description of these elements is omitted.

In the present embodiment, the camera internal operation, including error processing, with the digital video camera 100c set to the data transfer prioritizing mode is described with reference to the flow chart of FIG. B.

FIG. 8A and FIG. 8B are flowcharts showing a procedure for the camera internal operation control processing when the digital video camera 100c has been set to the data transfer prioritizing mode.

As shown in FIG. 8A and 8B, at the beginning of processing in the data transfer prioritizing mode set by the user via the operation unit 119, the microcomputer 101 of the digital video camera 100c checks whether the digital video camera 100c has established a connection with the external apparatus 112 (step S601). When the connection with the external apparatus 112 has not been established (i.e. data transfer is not possible), the microcomputer 101 proceeds to step S604 without performing the data transfer processing. When the connection with the external apparatus 112 has been established (i.e. data transfer is possible), the microcomputer 101 detects the remaining storage capacity of the storage medium 106 using the storage medium remaining capacity detecting unit 109, and judges whether the remaining storage capacity is at least a prescribed value based on the detection result.

When the remaining storage capacity of the storage medium 106 is less than the prescribed value, the microcomputer 101 performs data transfer to the external apparatus 112 connected to the digital video camera 100c via the data transfer I/F 111 (step S603). On the other hand, when the judgment result from step S602 indicates that the remaining storage capacity of the storage medium 106 exceeds the prescribed value, the microcomputer 101 proceeds to step S604.

Next, the microcomputer 101 checks whether charge of the batter 113 is possible based on the detection result from the remaining charge detecting unit 118 (step S604). When charge of the battery 113 is not possible, the microcomputer 101 proceeds to step S607. When charge of the battery 113 is possible, the microcomputer 101 judges whether the amount of charge remaining in the battery 113 is greater than or equal to a prescribed value based on the detection result from the remaining charge detecting unit 118 (step S605). When the amount of charge remaining in the battery 113 is less than the prescribed value, the microcomputer 101 charges the battery 113 for a succession of fixed periods using the charging circuit 115 (step S606). The case that charge is not possible includes when the battery 113 is not fitted to the digital video camera 100c.

Data transfer processing is performed from step S607 to step S609. The microcomputer 101 initially checks whether a connection between the digital video camera 100c and the external apparatus 112 has been established (step S607). When the connection with the external apparatus 112 has not been established (i.e. data transfer is not possible), the microcomputer 101 proceeds to step S610.

When the check result of step S607 indicates that the connection with the external apparatus 112 has been established (i.e. data transfer is possible), the microcomputer 101 judges whether non-transferred data is present in the storage medium 106 (step S608). When non-transferred data is absent, the microcomputer 101 proceeds to step S610. When non-transferred data is present, the microcomputer 101 transfers all remaining data in the storage medium 106 to the external apparatus 112 via the data transfer I/F 111 (step S609).

Charge processing is performed from step S610 to step S612. The microcomputer 101 initially checks whether charge of the battery 113 is possible based on the detection result from the remaining charge detecting unit 118 (step S610). When charge of the battery 113 is not possible, the microcomputer 101 returns to the data transfer processing. If, at this point, the data transfer has already been completed and the storage medium 106 is empty (NO to step S608 and YES to step S610), the microcomputer 101 skips the data transfer processing and loops until charge of the battery 113 becomes possible.

When the check result of step S610 indicates that charge is possible, the microcomputer 101 judges whether the battery 113 is fully charged (step 8611). When the battery 113 is not fully charged, the microcomputer 101 performs charge until the battery 113 becomes fully charged using the charging circuit 115 (step S612). When the battery 113 becomes fully charged, the microcomputer 101 proceeds to step S613.

Arrival at step S613 indicates that the battery 113 has been fully charged, and so the microcomputer 101 then checks whether non-transferred data is present in the storage medium 106 (step S613). When non-transferred data is present, the microcomputer 101 returns to the data transfer processing. When non-transferred data is absent, the microcomputer 101 ends the processing.

As described above, according to the present embodiment, battery charge and data transfer are possible in a limited period of time without extra work from the user, an increase in the number of parts of the digital camera 100c, or a rise in cost. Hence, it is possible to solve the problem of the digital video camera 100c becoming unusable due to the battery running out or insufficient remaining storage capacity in the storage medium.

In the above-described first to fourth embodiments, although examples in which the prescribed value for the amount of charge remaining in the battery 113 was set to 50% and the prescribed value for the remaining storage capacity in the storage medium 106 was set to 50% of the total capacity were described, the present invention is not limited to these settings. The prescribed value for the amount of charge remaining and the prescribed value for the remaining storage capacity may be set freely to any value within the scope of the present invention.

The above-described first to fourth embodiments describe examples in which charging and data transfer are realized in a digital video camera capable of setting an order of priority for performing the charge and the data transfer. However the present invention is not limited to such a digital video camera. The present invention may further be applied to a digital video camera not capable of setting the above-described order of priority. In such a digital video camera, the microcomputer judges whether an amount of charge remaining in the battery has reached a first prescribed value, and if the not, performs charge until the amount of charge remaining reaches a second prescribed value. Here, the first prescribed value and the second prescribed value may be the same value. When the amount of charge remaining in the battery has reached the second prescribed value, the microcomputer performs data transfer. When the data transfer is complete, the microcomputer performs charge to a third prescribed value (until the battery is fully charged, for instance)

In the above-described first to fourth embodiments, the type of the external apparatus 112 connected to the digital video camera is not stated, and there are no particular limits on the type of the external apparatus 112. Various types of external apparatus can be used, including hard disk recorders and the like.

The above-described first to fourth embodiments describe examples in which the imaging device of the present application is a digital video camera. However the imaging device of the present invention is not limited to being a digital video camera. The present invention can be applied in electronic cameras other than digital video cameras.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-262721 filed Sep. 27, 2006, which is hereby incorporated by reference herein in its entirety.

What is claimed is:

1. An imaging device including a battery charge function for charging a battery and a data transfer function for transferring data recorded in a storage medium to an external apparatus, the imaging device comprising:

a remaining charge detecting unit configured to detect an amount of charge remaining in the battery;

a remaining storage capacity detecting unit configured to detect a remaining storage capacity available for recording data in the storage medium;

an operating unit configured to allow a user to select any mode among a charge prioritizing mode in which charging the battery is prioritized and a data transfer prioritizing mode in which transferring the data recorded in the storage medium to the external apparatus is prioritized;

a setting unit configured to set one of the battery charge prioritizing mode or the data transfer prioritizing mode according to the selected mode through said operating unit; and a control unit configured to provide a control of:
when the amount of charge remaining detected by said remaining charge detecting unit is less than a prescribed charge value in a case where the charge prioritizing mode is selected, charging the battery until the amount of charge remaining reaches the prescribed charge value,
when the remaining storage capacity detected by said remaining storage capacity detecting unit is less than a prescribed storage value after the amount of charge remaining has reached the prescribed charge value, in a case where the charge prioritizing mode is selected, transferring data from the storage medium to the external apparatus until the remaining storage capacity reaches the prescribed storage value,
when the battery is not fully charged after the amount of charge remaining has reached the prescribed charge value, in a case where the charge prioritizing mode is selected, charging the battery until the battery is fully charged, and thereafter when the storage medium still includes not-yet transferred data, transferring all the not-yet transferred data to the external apparatus, and
when the remaining storage capacity detected by said remaining storage capacity detecting unit is less than the prescribed storage value in a case where the data transfer prioritizing mode is selected, transferring data from the storage medium to the external apparatus until the remaining storage capacity reaches the prescribed storage value.

2. The imaging device according to claim 1, wherein when a connection with the external apparatus is not established or the external apparatus is unable to receive transfer data, said control unit charges the battery without reference to the order of priority set by said setting unit.

3. The imaging device according to claim 1, wherein when charge of the battery is not possible or the battery is not fitted to the imaging device, said control unit transfers data without reference to the order of priority set by said setting unit.

4. A control method for an imaging device having a battery charge function for charging a battery and a data transfer function for transferring data recorded on a storage medium to an external apparatus, the method comprising:
a remaining charge detecting step of detecting an amount of charge remaining in the battery;
a remaining storage capacity detecting step of detecting a remaining storage capacity available for recording data in the storage medium;
a selecting step of allowing a user to select any mode among a charge prioritizing mode in which charging the battery is prioritized and a data transfer prioritizing mode in which transferring the data recorded in the storage medium to the external apparatus is prioritized;
a setting step of setting one of the battery charge prioritizing mode or the data transfer prioritizing mode according to the selected mode made in said selecting step; and
a control step of providing a control of:
when the amount of charge remaining detected in said remaining charge detecting step is less than a prescribed charge value in a case where the charge prioritizing mode is selected, charging the battery until the amount of charge remaining reaches the prescribed charge value,
when the remaining storage capacity detected by said remaining storage capacity detecting unit is less than a prescribed storage value after the amount of charge remaining has reached the prescribed charge value, in a case where the charge prioritizing mode is selected, transferring data from the storage medium to the external apparatus until the remaining storage capacity reaches the prescribed storage value,
when the battery is not fully charged after the amount of charge remaining has reached the prescribed charge value, in a case where the charge prioritizing mode is selected, charging the battery until the battery is fully charged, and thereafter when the storage medium still includes not-yet transferred data, transferring all the not-yet transferred data to the external apparatus, and
when the remaining storage capacity detected in said remaining storage capacity detecting step is less than the prescribed storage value in a case where the data transfer prioritizing mode is selected, transferring data from the storage medium to the external apparatus until the remaining storage capacity reaches the prescribed storage value.

5. A non-transitory computer-readable storage medium storing a computer program executable by an imaging device having a battery charge function for charging a battery and a data transfer function for transferring data recorded on a storage medium to an external apparatus, to carry out a control method comprising:
a remaining charge detecting step of detecting an amount of charge remaining in the battery;
a remaining storage capacity detecting step of detecting a remaining storage capacity available for recording data in the storage medium;
a selecting step of allowing a user to select any mode among a charge prioritizing mode in which charging the battery is prioritized and a data transfer prioritizing mode in which transferring the data recorded in the storage medium to the external apparatus is prioritized;
a setting step of setting one of the battery charge prioritizing mode or the data transfer prioritizing mode according to the selected mode made in said selecting step; and
a control step of providing a control of:
when the amount of charge remaining detected in said remaining charge detecting step is less than a prescribed charge value in a case where the charge prioritizing mode is selected, charging the battery until the amount of charge remaining reaches the prescribed charge value,
when the remaining storage capacity detected by said remaining storage capacity detecting unit is less than a prescribed storage value after the amount of charge remaining has reached the prescribed charge value, in a case where the charge prioritizing mode is selected, transferring data from the storage medium to the external apparatus until the remaining storage capacity reaches the prescribed storage value,
when the battery is not fully charged after the amount of charge remaining has reached the prescribed charge value, in a case where the charge prioritizing mode is selected, charging the battery until the battery is fully charged, and thereafter when the storage medium still includes not-yet transferred data, transferring all the not-yet transferred data to the external apparatus, and
when the remaining storage capacity detected in said remaining storage capacity detecting step is less than the prescribed storage value in a case where the data transfer prioritizing mode is selected, transferring data from the storage medium to the external apparatus until the remaining storage capacity reaches the prescribed storage value.

* * * * *